United States Patent
Koshizen (10) Patent No.: US 9,443,424 B2
(45) Date of Patent: Sep. 13, 2016

(54) METHOD OF DISPLAYING TRAFFIC CONGESTION ESTIMATION

(75) Inventor: Takamasa Koshizen, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 13/807,241

(22) PCT Filed: Jun. 2, 2011

(86) PCT No.: PCT/JP2011/062708
§ 371 (c)(1),
(2), (4) Date: Dec. 27, 2012

(87) PCT Pub. No.: WO2012/002098
PCT Pub. Date: Jan. 5, 2012

(65) Prior Publication Data
US 2013/0103294 A1    Apr. 25, 2013

(30) Foreign Application Priority Data
Jun. 29, 2010   (JP) .................. 2010-147572

(51) Int. Cl.
*G08G 1/00* (2006.01)
*B60K 37/02* (2006.01)
*G08G 1/01* (2006.01)

(52) U.S. Cl.
CPC ............... *G08G 1/00* (2013.01); *B60K 37/02* (2013.01); *G08G 1/0133* (2013.01); *B60K 2350/1064* (2013.01); *Y02T 10/84* (2013.01)

(58) Field of Classification Search
None
See application file for complete search history.

(56) References Cited

U.S. PATENT DOCUMENTS

| | | | |
|---|---|---|---|
| 6,785,606 B2* | 8/2004 | DeKock et al. | 701/117 |
| 7,797,101 B2* | 9/2010 | Tanaka | 701/117 |
| 2004/0068393 A1* | 4/2004 | Lawrence | 702/183 |
| 2005/0137756 A1* | 6/2005 | Takahashi | 701/1 |
| 2008/0040022 A1 | 2/2008 | Tanaka | |
| 2008/0319639 A1* | 12/2008 | Yamane | 701/118 |
| 2009/0234552 A1* | 9/2009 | Takeda et al. | 701/96 |
| 2009/0326804 A1* | 12/2009 | Machino | 701/201 |

(Continued)

FOREIGN PATENT DOCUMENTS

| | | |
|---|---|---|
| JP | 10-79094 A | 3/1998 |
| JP | 2004-62594 A | 2/2004 |

(Continued)

OTHER PUBLICATIONS

Machine Translation of JP-2004233191.*

(Continued)

*Primary Examiner* — John R Olszewski
*Assistant Examiner* — James M McPherson
(74) *Attorney, Agent, or Firm* — Westerman, Hattori, Daniels & Adrian, LLP (57) ABSTRACT

Disclosed is a method of displaying traffic congestion estimation including a step of detecting a transition state that exists when transitioning from a free flow in which a possibility (probability of occurrence) of an occurrence of traffic congestion is lower than a first set value, to a mixed flow in which states of braking and accelerating the vehicle are mixed as the state of the flow of traffic, and a step of displaying the possibility (probability of occurrence) of transition from the free flow to the mixed flow in a continuous and visual manner on the basis of the detection result of the transition state.

5 Claims, 6 Drawing Sheets

(56) References Cited

U.S. PATENT DOCUMENTS

| | | | |
|---|---|---|---|
| 2010/0082227 A1* | 4/2010 | Posner et al. | 701/118 |
| 2011/0112747 A1* | 5/2011 | Downs et al. | 701/118 |
| 2012/0072097 A1* | 3/2012 | Ohta et al. | 701/118 |
| 2012/0123660 A1* | 5/2012 | Kagawa | B60W 30/16 701/96 |
| 2014/0052366 A1* | 2/2014 | Rothschild | 701/118 |

FOREIGN PATENT DOCUMENTS

| | | | |
|---|---|---|---|
| JP | 2004-233191 A | 8/2004 | |
| JP | 2004-272408 A | 9/2004 | |
| JP | 2009-286274 A | 12/2009 | |
| WO | WO2010134396 | * 11/2010 | |

OTHER PUBLICATIONS

International Search Report, PCT/JP2011/062708 dated Sep. 13, 2011.

Chinese Office Action dated Oct. 19, 2015 issued in counterpart Chinese patent application No. 201180031951.X, with partial English translation (7 pages).

\* cited by examiner

METHOD OF DISPLAYING TRAFFIC CONGESTION ESTIMATION

CROSS-REFERENCE TO RELATED APPLICATION

This application is a National Stage entry of International Application No. PCT/JP2011/062708 filed Jun. 2, 2011, which claims priority to Japanese Patent Application Nos. 2010-147572 filed Jun. 29, 2010, the disclosure of the prior applications are hereby incorporated in their entirety by reference.

TECHNICAL FIELD

The present invention relates to a method of displaying traffic congestion estimation.

Priority is claimed on Japanese Patent Application No. 2010-147572, filed Jun. 29, 2010, the content of which is incorporated herein by reference.

BACKGROUND ART

In the related art, for example, as an apparatus which reports a traveling state, there has been known an apparatus in which other vehicles are detected by a millimeter wave radar device, the density of the other vehicles within a predetermined distance of a host vehicle is calculated and, further, using critical density according to the speed of the host vehicle, whether the traveling state of the host vehicle will cause traffic congestion or not is determined and the result reported to a driver (for example, refer to patent document 1).

DOCUMENTS OF THE PRIOR ART

Patent Documents

[Patent document 1] Japanese Unexamined Patent Application, First Publication No. 2009-286274

DISCLOSURE OF INVENTION

Problems to be Solved by the Invention

Since a determination process using vehicle density using the apparatus of the related art is simple, it is difficult to improve the accuracy of traffic congestion estimation, and there is a problem that it is not possible to provide a driver with appropriate information.

The present invention is made from consideration of such a problem, and an object of the present invention is to provide a method of displaying traffic congestion estimation which is capable of providing appropriate information for a driver by improving the accuracy of traffic congestion estimation.

Means for Solving the Problem

In order to solve the above problem, the present invention employed the following.

(1) According to an aspect of the present invention, there is provided a method of displaying traffic congestion estimation including a step of detecting a transition state that exists when changing from a free flow in which the probability of an occurrence of traffic congestion is lower than a first set value, to a mixed flow in which states of braking and accelerating the vehicle are mixed, as the state of the flow of traffic, and a step of displaying the probability of the occurrence of changing from the free flow to the mixed flow in a continuous and visual manner on the basis of the detection result of the transition state.

(2) In the method of displaying traffic congestion estimation according to (1), the probability of an occurrence of traffic congestion is equal to or more than a second predetermined value.

(3) In the method of displaying traffic congestion estimation according to (1), the probability of an occurrence of traffic congestion is equal to or more than the first predetermined value and equal to or less than the second predetermined value.

(4) The method of displaying traffic congestion estimation according to (1), further includes a communication step of transmitting the probability of an occurrence of traffic congestion to another vehicle by communication on the basis of the detection result of the transition state.

(5) The method of displaying traffic congestion estimation according to (1), further includes a path search step and a path guide step so that the host vehicle avoids traffic congestion on the basis of the detection result of the transition state.

Effects of the Invention

In the method of displaying traffic congestion estimation according to the aspect of the present invention, a display is performed in a continuous and visual manner on the basis of the detection result of the transition state which is a previous stage of the mixed flow with respect to the mixed flow having a high probability of occurrence of traffic congestion so that the driver can specifically estimate the occurrence of traffic congestion at an early stage and with accuracy.

In the case of (2), a lower limit of the probability of occurrence can be defined.

In the case of (3), a lower limit and an upper limit of the transition state can be appropriately defined.

In the case of (4), the estimation result is directly or indirectly transmitted to the other vehicle through a proper relay station or the like so that the other vehicle easily avoids traffic congestion.

In the case of (5), it is possible to search for a path in which the host vehicle avoids traffic congestion on the basis of the estimation result.

EMBODIMENTS FOR CARRYING OUT THE INVENTION

Hereinafter, an embodiment of a method of displaying traffic congestion estimation according to the present invention will be described with reference to the appended drawings.

The method of displaying traffic congestion estimation according to the embodiment is realized by, for example, a traffic congestion estimation apparatus 10 mounted in a host vehicle.

Figure 1:
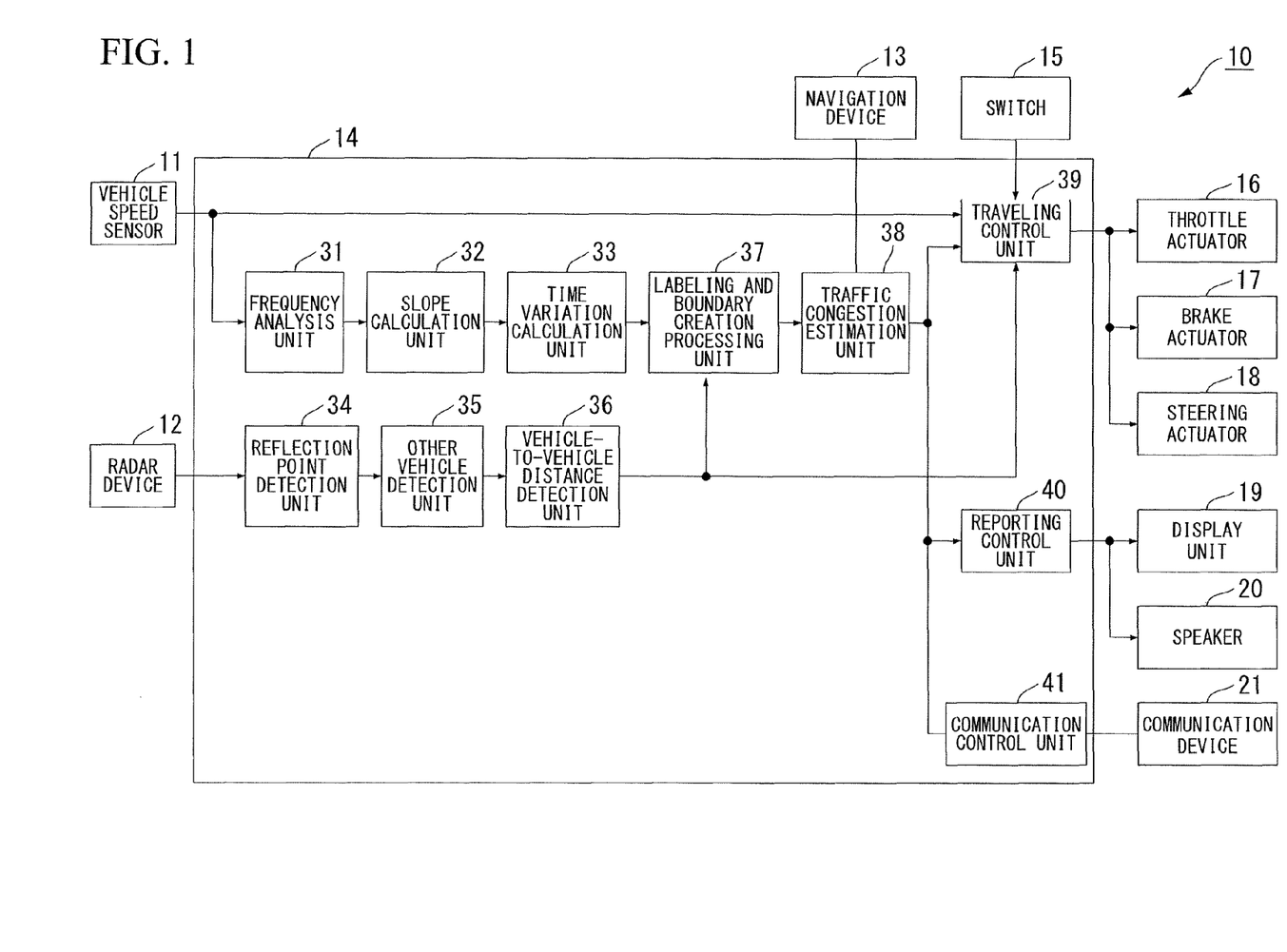
FIG. 1 is a configuration view of a traffic congestion estimation apparatus according to an embodiment of the present invention.

For example, as shown in FIG. 1, the traffic congestion estimation apparatus 10 according to the embodiment includes a vehicle speed sensor 11, a radar device 12, a navigation device 13, a processing device 14, a switch 15, a throttle actuator 16, a brake actuator 17, a steering actuator 18, a display unit 19, a speaker 20 and a communication device 21.

The vehicle speed sensor 11 detects the speed of the host vehicle (vehicle speed) and outputs the signal of the detection result.

The radar device 12 divides a detection target region which is set on the outside of the host vehicle into plural angle regions and transmits transmission signals of an infrared laser, electromagnetic waves such as millimeter waves so as to perform scanning in each angle region. Then, the radar device 12 receives the reflected signals generated in such a manner that each transmission signal is reflected by an object external to the host vehicle (for example, other vehicles, structures, the road surface). Then, the signals according to the transmission signals and the reflected signals are output to the processing device 14.

For example, the radar device 12 divides a detection target region in a predetermined angle range from the host vehicle into a plurality of vertical angle regions of the vertical direction of the host vehicle and a plurality of horizontal angle regions of the horizontal direction of the host vehicle. Then, while the plurality of vertical angle regions are sequentially switched, for example, from above to below in the vertical direction, the radar device 12 transmits electromagnetic waves to each of the plurality of vertical angle regions and while the plural horizontal angle regions are sequentially switched, for example, from left to right in the horizontal direction, the radar device transmits electromagnetic waves to each of the plural horizontal angle regions.

The navigation device 13 receives a positioning signal such as a GPS (Global Positioning System) signal to measure the position of the host vehicle by using, for example, satellites and calculates the current position of the host vehicle on the basis of the positioning signal.

In addition, for example, the navigation device 13 calculates the current position of the host vehicle by a calculation process of autonomous navigation based on the speed of the host vehicle (vehicle speed) and a yaw-rate detection signal output from the vehicle speed sensor 11 and a yaw-rate sensor (not shown).

In addition, the navigation device 13 includes map display data to display a map on the display unit 19 and road coordinate data which is required for a map matching process on the basis of the current position of the host vehicle as map data. Furthermore, the navigation device 13 includes data required for processes such as a path search process or a path guide process, for example, road data including each node, which is a point including the latitude and longitude of a predetermined position such as an intersection or a junction, and each link which is a line linking the respective nodes as map data. In addition, various kinds of information are added to the nodes and links.

Then, the navigation device 13 performs the map matching process on the basis of the information of the current position of the host vehicle obtained from the respective calculation processes of the positioning signal and autonomous navigation or any one of the calculation processes with respect to the road data to correct the result of the position detection.

In addition, the navigation device 13 performs a process such as a path search process or a path guide process of the host vehicle according to an input operation of an operator, outputs path information and various kinds of additional information to a destination on the display unit 19 with the road data and outputs various kinds of voice messages from the speaker 20.

Then, the navigation device 13 can perform a process such as a path search process or a path guide process of the host vehicle based on an estimation result of occurrence of traffic congestion output from a traffic congestion estimation unit 38 which will be described later and an estimation result of the occurrence of estimated traffic congestion to another vehicle output from a communication control unit 41 which will be described later, for example, so as to avoid traffic congestion.

The processing device 14 includes, for example, a frequency analysis unit 31, a slope calculation unit 32, a time variation calculation unit 33, a reflection point detection unit 34, another vehicle detection unit 35, a vehicle-to-vehicle distance detection unit 36, a labeling and boundary creation processing unit 37, the traffic congestion estimation unit 38, a traveling control unit 39, a reporting control unit 40 and the communication control unit 41.

Then, various kinds of signals related to vehicle travel control of the host vehicle output from the switch 15 are input to the processing device 14.

As the signals output from the switch 15, for example, there are a signal related to the operation state of a brake pedal (not shown) by a driver, a signal related to the operation state of an accelerator pedal (not shown) by a driver, a signal that instructs the starting or stopping of performing autonomous traveling control which automatically controls the travel state of the host vehicle according to the input state of a driver, a signal that instructs the increase or decrease of target vehicle speed in the autonomous traveling control and a signal that instructs the increase or decrease of a target vehicle-to-vehicle distance with respect to a vehicle-to-vehicle distance between the host vehicle and another vehicle (for example, a preceding vehicle) in the autonomous traveling control (for example, the following traveling control that automatically follows a preceding vehicle).

Figure 2:
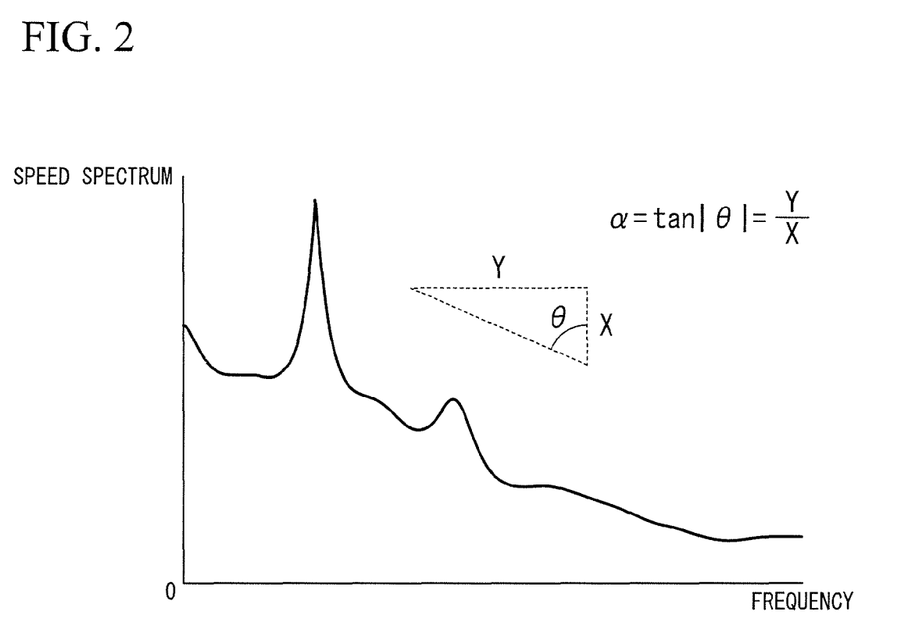
FIG. 2 is a graph showing an example of a speed spectrum according to the embodiment.

For example, the frequency analysis unit 31 analyzes the frequency of the detection result of the speed of the vehicle (vehicle speed) output from the vehicle speed sensor 11, for example, to output a power spectrum that changes according to a frequency of a speed spectrum as shown in FIG. 2.

The slope calculation unit 32, for example, calculates a simple linear regression line in the power spectrum output from the frequency analysis unit 31 and a slope and an intercept (a spectrum value when the frequency is zero) of the simple linear regression line are calculated. Then, for example, the slope cc represented by the following expression (1) is calculated on the basis of change X of a spectrum value in a predetermined frequency range Y (for example, which is a frequency range corresponding to a time range of several seconds to several minutes, such as a frequency range of 0 to 0.5 Hz) to output the calculation result.

[Expression 1]

$$\alpha = \tan|\theta| = \frac{Y}{X} \qquad (1)$$

The time variation calculation unit 33 calculates, for example, the difference of the slope $\alpha$ output from the slope calculation unit 32, that is, the difference $\Delta\alpha$ of a current value $\alpha_k$ and є previous value $\alpha_{k-1}$ of the slope $\alpha$ in a predetermined time interval by an arbitrary natural number k, for example, on the basis of the following expression (2).

[Expression 2]

$$\Delta\alpha = \alpha_k - \alpha_{k-1} \qquad (2)$$

For example, the reflection point detection unit 34 detects a position of a reflection point of the reflected signal on the basis of the signal output from the radar device 12 to output the detection result.

The other vehicle detection unit 35 detects at least one or more other vehicles present outside the host vehicle, in accordance with the distance between adjacent reflection points and the distribution state of plural reflection points, for example, on the basis of the detection result of the position of the reflection point output from the reflection point detection unit 34, to output the detection result.

The vehicle-to-vehicle distance detection unit 36 detects a vehicle-to-vehicle distance between the host vehicle and another vehicle, for example, on the basis of the detection result of at least one or more other vehicles output from the other vehicle detection unit 35 to output the detection result together with the number of other vehicles detected.

The labeling and boundary creation processing unit 37 associates each piece of data $(x_i, y_i)$ (i=1, . . . , n) with a label "+1" or "−1" on the basis of the difference $\Delta\alpha$ of the slope $\alpha$ output from the time variation calculation unit 33 such that data $(x_i, y_i)$ (i=1, . . . , n) using arbitrary numbers i and n is set as a combination of the vehicle-to-vehicle distance between the host vehicle and another vehicle and the speed of the host vehicle at an appropriate time point For example, the labeling and boundary creation processing unit 37 determines whether the difference $\Delta\alpha$ of the slope $\alpha$ output from the time variation calculation unit 33 or a predetermined parameter by the difference $\Delta\alpha$ (for example, a squared value $(\Delta\alpha)^2$ or an absolute value $|\Delta\alpha|$) is more than a predetermined threshold value. Then, when the determination result is "YES", the data $(x_i, y_i)$ is associated with the label "+1", and when the determination result is "No", the data $(x_i, y_i)$ is associated with the label "−1".

From the labeling process by the labeling and boundary creation processing unit 37, the distribution of the label "+1" or "−1" that is associated with each piece of data $(x_i, y_i)$ (i=1, . . . , n) can be obtained in a two dimensional space by a rectangular coordinate of the x axis and the y axis.

Then, the labeling and boundary creation processing unit 37 calculates a boundary between the label "+1" and the label "−1" and outputs the calculation result, for example, using an Allen-Calm equation with respect to the distribution of the label in the two dimensional space.

For example, the labeling and boundary creation processing unit 37 calculates an unknown function U (x, y) using the Allen-Calm equation as represented by the following expressions (3) to (5).

In the following expressions (3) to (5), a function ω (U) shows a double-well potential in which two minimum values correspond to two different phases and when a suitable parameter s relating to an edge of the boundary approaches zero, the unknown function U (x, y) approaches any one of values corresponding to the two minimum values (that is, −1 or +1) in two regions separated by the boundary.

Then, the labeling and boundary creation processing unit 37 calculates the boundary represented by the unknown function U (x, y)=0.

[Expression 3]

$$U = U(x, y) \qquad (3)$$

[Expression 4]

$$\frac{\partial U}{\partial t} = \Delta U - \left(\frac{1}{\varepsilon^2}\frac{d\omega(U)}{d(U)}\right) \qquad (4)$$

[Expression 5]

$$\omega(U) = \frac{1}{2}(1 - U^2)^2 \qquad (5)$$

Figure 3A:
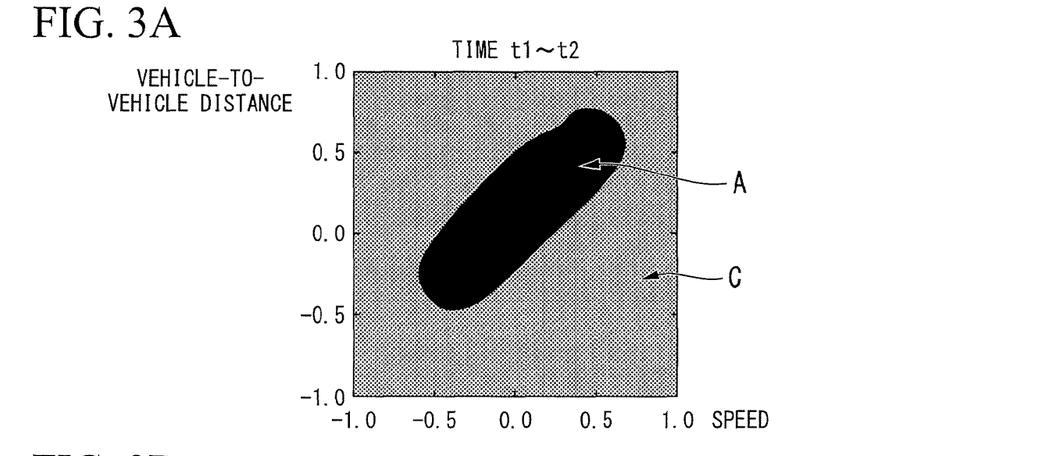
FIG. 3A is a view showing an example of a change between times t1 and t2 in a region A and a region C in a normalized two-dimensional space according to the embodiment of the present invention.
Figure 3B:
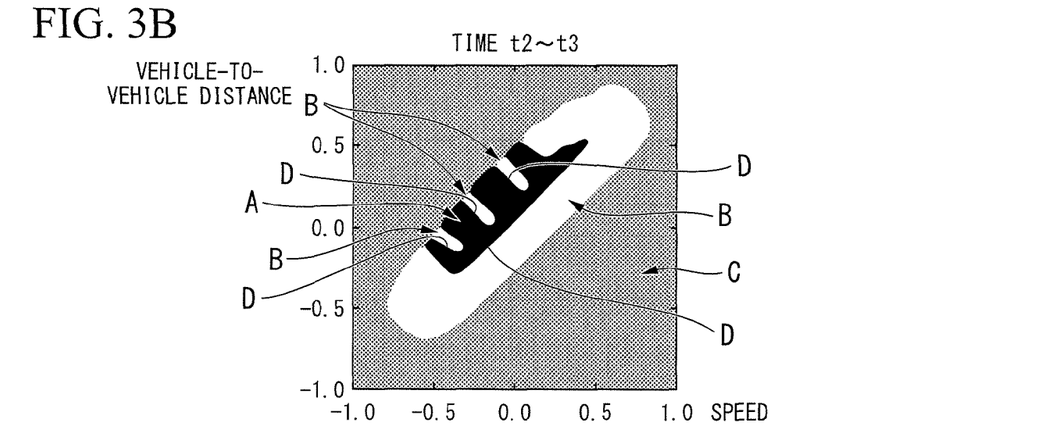
FIG. 3B is a view showing an example of a change between time t2 and t3 in each region A to C and a boundary D between the region A and the region B in the normalized two-dimensional space according to the embodiment of the present invention.
Figure 3C:
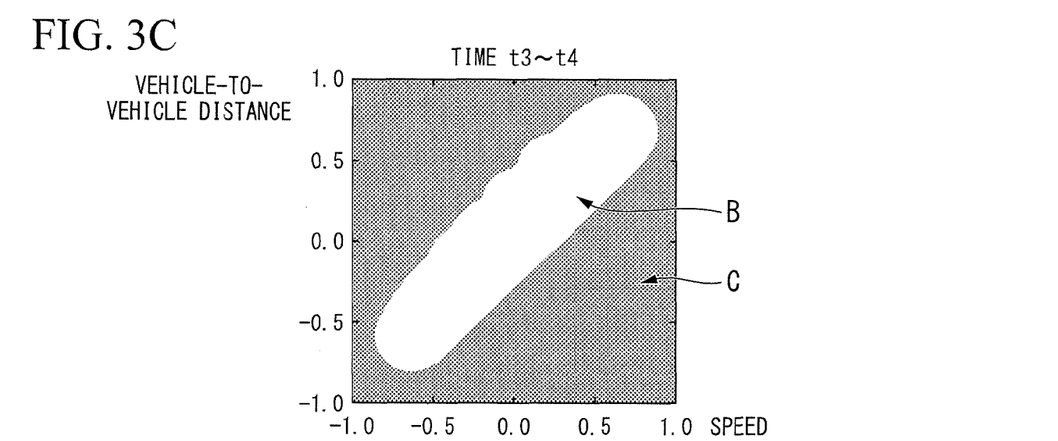
FIG. 3C is a view showing an example of a change between time t3 and t4 in the region B and the region C in the normalized two-dimensional space according to the embodiment of the present invention.

The calculation result of the boundary output from the labeling and boundary creation processing unit 37 is, for example, represented as shown in FIGS. 3A to 3C.

For example, FIGS. 3A to 3C show the distribution of the label in times t1 to t2, t2 to t3 and t3 to t4 in order of suitable time elapsed and a region A of the label "+1" is colored with black, a region B of the label "−1" is colored with white, and a region C in which data is not present is colored with grey, to show each of the regions A to C and the boundary D between the region A and the region B in a normalized two dimensional space (speed-vehicle-to-vehicle distance) of a horizontal axis (x axis) with the speed and a vertical axis (y axis) with the vehicle-to-vehicle distance in which a scale is normalized in a range of (−1) to (+1).

For example, the traffic congestion estimation unit 38 estimates the occurrence of traffic congestion on the basis of the calculation result of the boundary output from the labeling and boundary creation processing unit 37 (for example, the shape of the boundary D, the size of the regions A and B of the respective labels, and the like) and outputs the estimation result.

For example, in the traffic congestion estimation unit 38, the boundary output from the labeling and boundary creation processing unit 37 relates to a formation process of a vehicle group in front of the host vehicle in the traveling direction. As shown in FIG. 3B, a state where the boundary is generated is a state where a phase transition (that is, between a phase of the label "+1" and a phase of the label "−1") is generated and, for example, specifically, is brought by the unique state change when the state of the traffic flow transitions from the metastable flow to the mixed flow.

Figure 4:
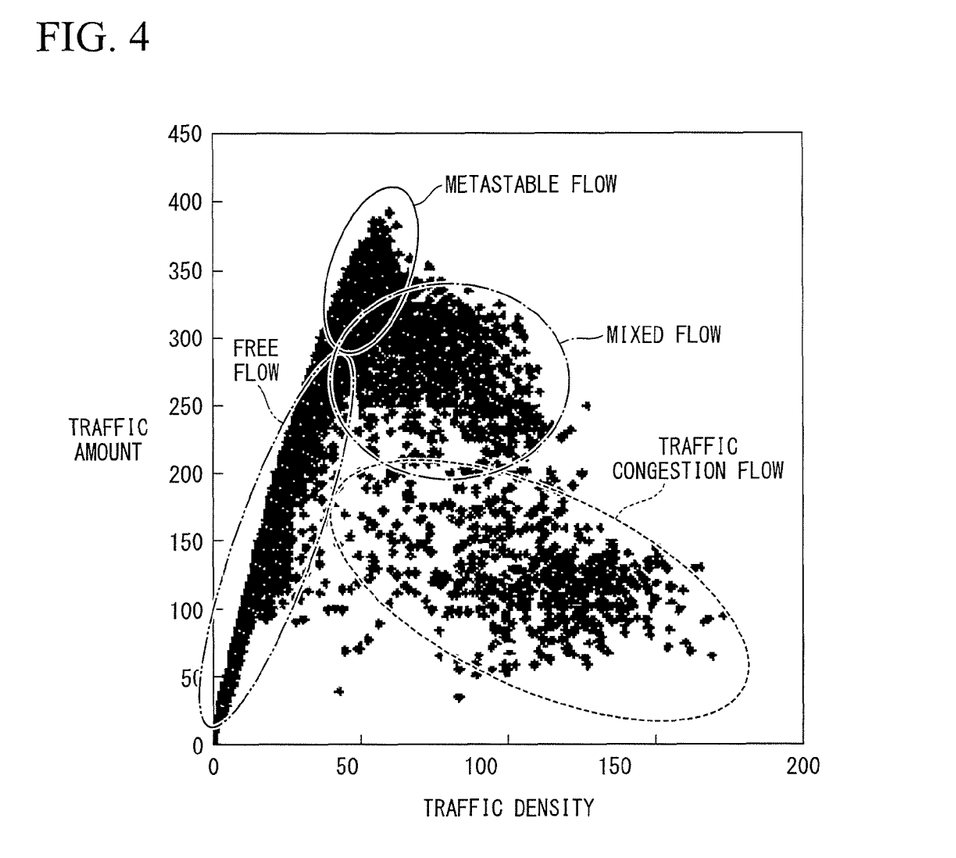
FIG. 4 is a view showing a state of a traffic flow according to the embodiment of the present invention.

Furthermore, for example, as shown in FIG. 4, in a rectangular coordinate plane with a traffic amount which is the number of vehicles passing a predetermined point in a predetermined time and traffic density which is the number of vehicles present in a predetermined distance range, the state of traffic flow is divided into a free flow which has a low possibility of traffic congestion occurring, the mixed flow in which a braking state and an accelerating state of the vehicle are mixed, a traffic congestion flow which is a traffic congestion state, and a metastable flow which is a transition state present when changing from the free flow to the mixed flow. In particular, the mixed flow is a state before the change to the traffic congestion flow and is a state having a high probability of the change to the traffic congestion flow due to decreasing the traffic amount and increasing the traffic density since the degree of freedom in the driving of a driver is decreased. In addition, the metastable flow is a state where the traffic amount and the traffic density are high in comparison with the free flow and is a state of changing to the mixed flow due to a decrease in the traffic amount and an increase in the traffic density.

For example, when a state where the boundary is not generated as shown in FIG. 3A is maintained, the traffic congestion estimation unit 38 determines the calculation result of the boundary output from the labeling and boundary creation processing unit 37 as a state where there is a low possibility (probability of occurrence) of traffic congestion occurring (for example, the probability of occurrence is lower than a first probability) or there is no possibility (probability of occurrence) of traffic congestion occurring.

In addition, when a change from the state where the boundary is not generated, for example, as shown in FIG. 3A to a state where the boundary is generated, for example, as shown in FIG. 3B is detected, the traffic congestion estimation unit 38 determines the calculation result of the boundary output from the labeling and boundary creation processing unit 37 as a state where a possibility (probability of occurrence) of traffic congestion occurring is higher than a second set value (for example, the probability of occurrence is equal to or more than a second probability (second set value)).

Moreover, when a change from the state where the boundary is generated, for example, as shown in FIG. 3B to a state where the boundary is not generated, for example, as shown in FIG. 3C is detected, the traffic congestion estimation unit 38 determines the calculation result of the boundary output from the labeling and boundary creation processing unit 37 as a state where a possibility (probability of occurrence) of traffic congestion occurring is higher (not lower) than the first set value and lower (not higher) than the second set value (for example, a probability of occurrence is equal to or more than the first probability (first set value) and less than the second probability (second set value)).

The traffic congestion estimation unit 38 outputs the estimation result to the navigation device 13, the traveling control unit 39 and the reporting control unit 40 when the estimation of the occurrence of traffic congestion is performed. Moreover, the position information such as the current position of the host vehicle and a predetermined region around the current position on the map data is obtained from the navigation device 13 and the estimation result and the position information are associated with each other to be stored and output to the communication control unit 41.

In addition, when the traffic congestion estimation unit 38 directly transmits the estimation result by the communication device 21 or transmits the estimation result to a preceding vehicle of the host vehicle through an appropriate server apparatus (not shown) and a relay station (not shown) in the case of outputting the estimation result to the communication control unit 41, a command to instruct the changing of the traveling state of the preceding vehicle to a traveling state where a following vehicle of the preceding vehicle is not likely to generate traffic congestion may be added.

The traveling control unit 39 controls the traveling of the host vehicle by controlling, for example, the throttle actuator 16, the brake actuator 17 and the steering actuator 18 based on the estimation result of the occurrence of traffic congestion output from the traffic congestion estimation unit 38, the estimation result of the occurrence of the estimated traffic congestion of another vehicle output from the communication control unit 41 which will be described later, various kinds of signals output from the switch 15, the detection result of the speed of the host vehicle (vehicle speed) output from the vehicle speed sensor 11, and the detection result of the vehicle-to-vehicle distance output from the vehicle-to-vehicle distance detection unit 37.

For example, the traveling control unit 39 starts or stops performing the autonomous traveling control according to the signals output from the switch 15, or sets or changes target speed and a target vehicle-to-vehicle distance in the autonomous traveling control.

In addition, for example, when it is determined that there is a possibility of traffic congestion occurring in front of the host vehicle in the traveling direction in the estimation result output from the traffic congestion estimation unit 38, the traveling control unit 39 sets the target vehicle speed and the target vehicle-to-vehicle distance required for the host vehicle to avoid traffic congestion (for example, to transition the state of the traffic flow from the metastable flow to the free flow). Then, the autonomous traveling control to maintain the target vehicle speed and the target vehicle-to-vehicle distance (for example, constant speed traveling control which makes the actual vehicle speed equal to the target vehicle speed and the vehicle-to-vehicle distance control which makes the actual vehicle-to-vehicle distance equal to the target vehicle-to-vehicle distance (for example, following traveling control) with respect to another vehicle (for example, a preceding vehicle), are performed.

In addition, for example, when it is determined that there is a possibility of traffic congestion occurring in front of the host vehicle in the traveling direction in the estimation result of the occurrence of the estimated traffic congestion to another vehicle (for example, a preceding vehicle or a following vehicle) output from the communication control unit 41 which will be described later, the traveling control unit 39 sets the target vehicle speed and the target vehicle-to-vehicle distance required for the host vehicle to avoid traffic congestion and further, for the following vehicle of the host vehicle to be unlikely to generate traffic congestion or changes the traveling state of the host vehicle.

The reporting control unit 40 controls various kinds of reporting operations by controlling, for example, the display unit 19 and the speaker 20 on the basis of the estimation result of traffic congestion output from the traffic congestion estimation unit 38 and the estimation result of the occurrence of the estimated traffic congestion to another vehicle (for example, a preceding vehicle or a following vehicle) output from the communication control unit 41 which will be described later.

For example, the reporting control unit 40 reports the presence of the possibility of traffic congestion occurring in front of the host vehicle in the traveling direction (or traffic congestion is likely to occur or traffic congestion is not likely to occur (probability of occurrence)), information on the position where the occurrence of traffic congestion is estimated, and instructions of driving operation which are required for the host vehicle to avoid traffic congestion and further, for the following vehicle of the host vehicle to be unlikely to generate traffic congestion.

Then, the reporting control unit 40 makes the driver recognize that a possibility (probability of occurrence) of traffic congestion occurring in front of the host vehicle in the traveling direction is higher than the first set value, traffic congestion has already occurred, a possibility (probability of occurrence) of traffic congestion occurring is lower than the second set value, and traffic congestion does not occur, for example, by appropriately controlling the display colors and display luminance of an image on the display unit 19, and appropriately controlling voice output from the speaker 20 in accordance with the estimation result output from the traffic congestion estimation unit 38.

Figure 5A:
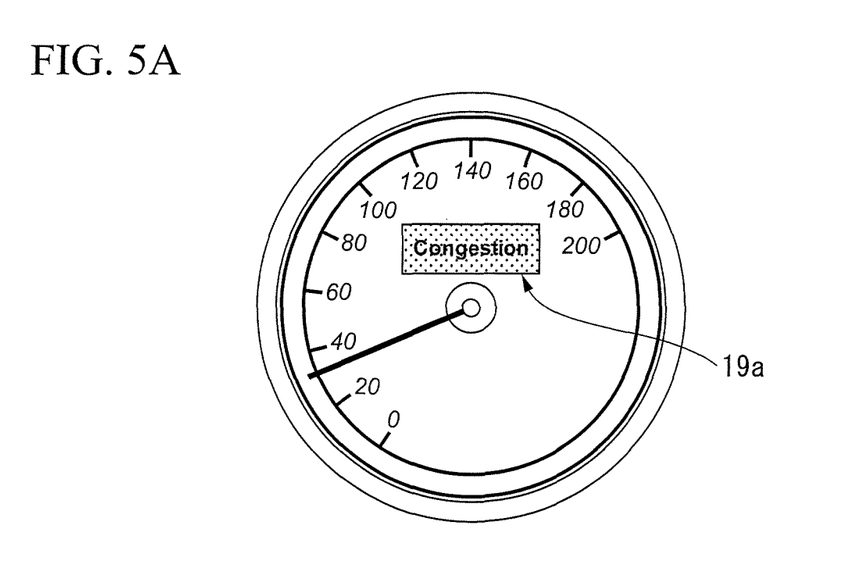
FIG. 5A is a view showing an example of a predetermined image which is displayed on a display section according to the embodiment of the present invention.

For example, as shown in FIG. 5A, the display unit 19 includes a display section 19a in which depth of a display color of the predetermined image can be changed in accordance with a possibility (probability of occurrence) of traffic congestion occurring provided, for example, on a display board of meters (for example, a speed meter) of the host vehicle.

Then, the reporting control unit 40 controls the depth of the display color of the predetermined image displayed on the display section 19a in accordance with the estimation result output from the traffic congestion estimation unit 38, that is, the state of the boundary (for example, the shape of the boundary D, the size of the regions A and B of the respective labels and the like) calculated by the labeling and boundary creation processing unit 37.

Figure 5B:
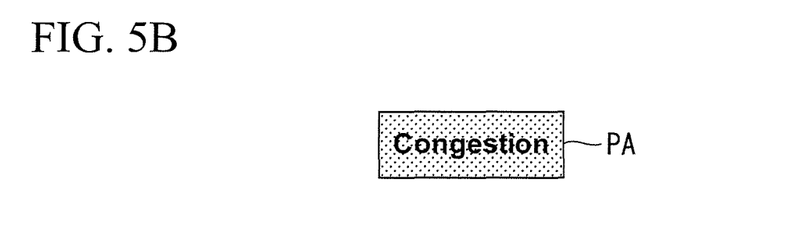
FIG. 5B is a view showing an example in which depth of a display color of the predetermined image is changed in accordance with a possibility (probability of occurrence) of traffic congestion occurring on the display section according to the embodiment of the present invention.

For example, when the estimation result is determined to be a state where a possibility (probability of occurrence) of traffic congestion occurring is low (for example, the probability of occurrence is less than the first probability) or there is no possibility, the reporting control unit 40 makes the display section 19a display a predetermined image PA which has low depth of a display color (for example, the depth is less than a first depth), for example, as shown in FIG. 5B.

Figure 5C:
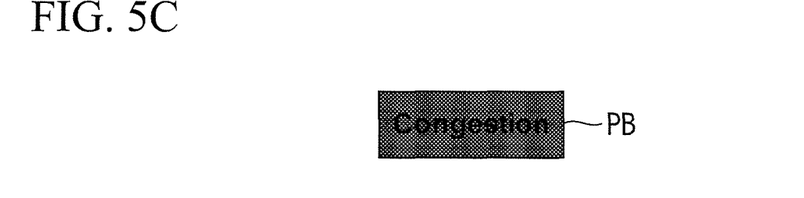
FIG. 5C is a view showing an example in which depth of a display color of the predetermined image is changed in accordance with a possibility (probability of occurrence) of traffic congestion occurring on the display section according to the embodiment of the present invention.

In addition, for example, when the estimation result is determined to be a state where a possibility (probability of occurrence) of traffic congestion occurring is high (for example, the probability of occurrence is equal to or more than the second probability), the reporting control unit 40 makes the display section 19a display a predetermined image PB which has high depth of a display color (for example, the depth is equal to or more than a second depth), for example, as shown in FIG. 5C.

Figure 5D:
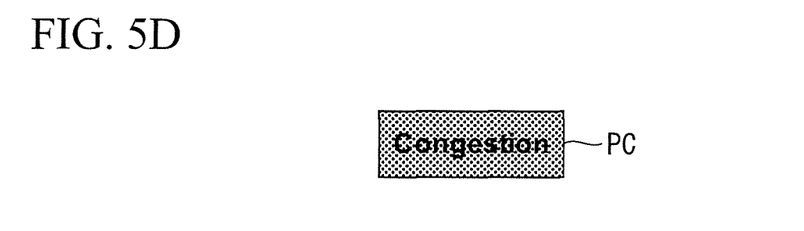
FIG. 5D is a view showing an example in which depth of a display color of the predetermined image is changed in accordance with a possibility (probability of occurrence) of traffic congestion occurring on the display section according to the embodiment of the present invention.

In addition, for example, when the estimation result is determined to be a state where a possibility (probability of occurrence) of traffic congestion occurring is not low and not high (for example, the probability of occurrence is equal to or more than the first probability and less than the second probability), the reporting control unit 40 makes the display section 19a display a predetermined image PC in which has a medium degree of depth of a display color (for example, the depth is equal to or more than the first depth and less than the second depth), for example, as shown in FIG. 5D.

The communication control unit 41 communicates with another vehicle or an appropriate server apparatus (not shown) and a relay station, for example, through radio communication by the communication device 21, and makes the estimation result of the occurrence of traffic congestion output from the traffic congestion estimation unit 38 and the position information associated with each other to be transmitted, or receives the information in which the estimation result with respect to the occurrence of the estimated traffic congestion to another vehicle and the position information are associated with each other. Then, the associated information of the estimation result with respect to the occurrence of traffic congestion obtained from the outside and the position information is output to the navigation device 13, the traveling control unit 39 and the reporting control unit 40.

The traffic congestion estimation apparatus 10 according to the embodiment is provided with the above configuration and the operations of the traffic congestion estimation apparatus 10, particularly, a process of the method of displaying the traffic congestion estimation will be described below.

Figure 6:
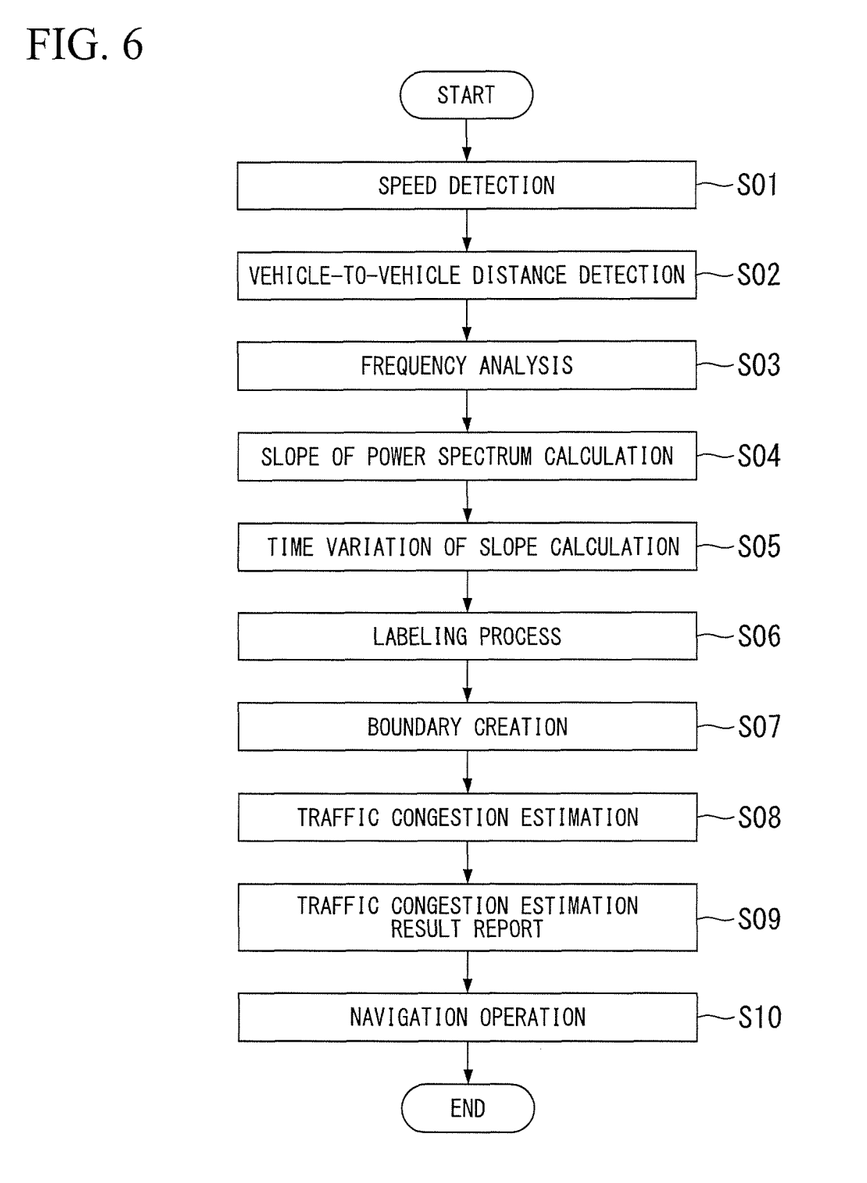
FIG. 6 is a flowchart showing a process of a method of displaying traffic congestion estimation.

First, for example, the speed of the host vehicle (vehicle speed) is detected by the vehicle speed sensor 11 in Step S01 shown in FIG. 6.

Next, at least one or more other vehicles present outside the host vehicle are detected on the basis of the signal output from the radar device 12 and the vehicle-to-vehicle distance between the host vehicle and another vehicle is detected in Step S02.

Next, the frequency of the detection result of the speed of the host vehicle (vehicle speed) output from the vehicle speed sensor 11 is analyzed to output a power spectrum which shows changes according to the frequency of the speed spectrum in Step S03.

Next, the simple regression line of the power spectrum is calculated and the slope and the intercept (the spectrum value when the frequency is zero) of the simple regression line are calculated in Step S04. Then, the slope $\alpha$, for example, represented by the above expression (1) is calculated on the basis of change X of the spectrum value in a predetermined frequency range (for example, a frequency range of 0 to 0.5 Hz) Y.

Next, the difference $\Delta\alpha$ of the current value $\alpha_k$ and the previous value $\alpha_{k-1}$ of the slope $\alpha$ in a predetermined time interval is calculated in Step S05

Next, the data $(x_i, y_i)$ (i=1, . . . , n) using the arbitrary natural numbers i and n is set as a combination of the vehicle-to-vehicle distance between the host vehicle and other vehicle and the speed of the host vehicle at an appropriate time point so that each piece of data $(x_i, y_i)$ is associated with the label "+1" or "−1" according to whether the absolute value $|\Delta\alpha|$ of the difference $\Delta\alpha$ of the slope $\alpha$ is larger than a predetermined threshold value in Step S06.

Next, the boundary between the label "+1" and the label "−1" is calculated, for example, using an Allen-Calm equation with respect to the distribution of the label in the two dimensional space by the rectangular coordinate of the horizontal axis (x axis) with the speed and the vertical axis (y axis) with the vehicle-to-vehicle distance in Step S07.

Next, the occurrence of traffic congestion is estimated on the basis of the calculation result of the boundary in Step S08.

Next, the report in accordance with the estimation result of the occurrence of traffic congestion is made in Step S09.

Next, various kinds of navigation operations in accordance with the estimation result of the occurrence of traffic congestion, for example, processes like a path search process or a path guide process of the host vehicle so as to avoid traffic congestion are performed and the process proceeds to End in Step S10.

As described above, the labeling and the boundary calculation are performed on the basis of the difference Δα of the slope α of the speed power spectrum with respect to the data by the combination of the speed of the host vehicle and the vehicle-to-vehicle distance between the host vehicle and another vehicle and the display, corresponding to the change of the boundary, is performed in a continuous and visual manner so that a driver can specifically estimate the occurrence of traffic congestion at an early stage and with accuracy in the method of displaying traffic congestion according to the embodiment.

In other words, the boundary output from the labeling and boundary creation processing unit 37 relates to the formation process of the vehicle group and, specifically, it is considered that the boundary is brought by the unique state change when the state of the traffic flow transitions from the metastable flow to the mixed flow. Due to this, the boundary detection corresponds to the metastable flow detection in which a possibility (probability of occurrence) of the transition to the mixed flow is high and a driver can appropriately estimate the occurrence of traffic congestion at an early stage at a time point before the mixed flow in which a probability of transition to the traffic congestion flow is high occurs.

INDUSTRIAL APPLICABILITY

According to the embodiment of the present invention, it is possible for a driver to specifically estimate the occurrence of traffic congestion at an early stage and with accuracy.

DESCRIPTION OF REFERENCE SYMBOLS 10 traffic congestion estimation apparatus
11 vehicle speed sensor
12 radar device
19 display unit
20 speaker
21 communication device
31 frequency analysis unit
32 slope calculation unit
33 time variation calculation unit
34 reflection point detection unit
35 other vehicle detection unit
36 vehicle-to-vehicle distance detection unit
37 labeling and boundary creation processing unit
38 traffic congestion estimation unit
39 traveling control unit
40 reporting control unit
41 communication control unit

The invention claimed is:

1. A method of displaying traffic congestion estimation by using a traffic congestion estimation apparatus the traffic congestion estimation apparatus comprising:
a vehicle speed sensor configured to detect a speed of a vehicle;
a vehicle-to-vehicle distance detection unit configured to detect a vehicle-to-vehicle distance between the vehicle and another vehicle;
a display unit;
a frequency analysis unit configured to analyze a frequency of a detection result of the speed of the vehicle output from the vehicle speed sensor;
a slope calculation unit configured to calculate a simple linear regression line in a power spectrum output from the frequency analysis unit and a slope and an intercept of the simple linear regression line are calculated;
a time variation calculation unit configured to calculate a difference of the slope output from the slope calculation unit;
a labeling and boundary creation processing unit configured to associate each piece of data with a label "+1" or "−1" on the basis of the difference of the slope output from the time variation calculation unit is set as a combination of the vehicle-to-vehicle distance between the vehicle and the another vehicle and the speed of the vehicle, obtain a distribution of the label "+1" or "−1" that is associated with each piece of the data in a two dimensional space, and calculate a boundary between the label "+1" and the label "−1" and output a calculation result with respect to the distribution of the label in the two dimensional space;
a traffic congestion estimation unit configured to estimate an occurrence of a traffic congestion on the basis of the calculation result of the boundary output from the labeling and boundary creation processing unit and output an estimation result; and
a processing device configured to display on the display unit the estimation result, wherein the processing device comprises:
a step of associating a combination of the speed of the vehicle and the vehicle-to-vehicle distance with a parameter that is distributed in a two-dimensional space, and determining when a phase transition of that parameter occurs to detect a state of a flow of traffic corresponding to a transition state that is present when changing from a free flow in which a probability of the occurrence of the traffic congestion is lower than a first predetermined value, to a mixed flow in which states of braking and accelerating the vehicle are mixed; and
a step of displaying the probability of the occurrence of changing from the free flow to the mixed flow in a continuous and visual manner on the basis of the detection result of the transition state.

2. The method of displaying traffic congestion estimation according to claim 1,
wherein the probability of occurrence is equal to or more than a second predetermined value in a traffic congestion state.

3. The method of displaying traffic congestion estimation according to claim 2,
wherein the probability of occurrence is equal to or more than the first predetermined value and equal to or less than the second predetermined value in the transition state.

4. The method of displaying traffic congestion estimation according to claim 1, wherein the processing device further includes a communication step of transmitting the probability of occurrence to the another vehicle by a communication on the basis of the detection result of the transition state.

5. The method of displaying traffic congestion estimation according to claim 1,
wherein the processing device further includes a path search step and a path guide step in which the vehicle avoids the traffic congestion on the basis of the detection result of the transition state.

* * * * *